(12) United States Patent
Pretorius et al.

(10) Patent No.: US 6,488,017 B1
(45) Date of Patent: Dec. 3, 2002

(54) PIEZOELECTRIC IGNITION DEVICE FOR INCREASING SPARK ENERGY

(75) Inventors: Jacob van Reenen Pretorius, Cambridge; Brett Peter Masters, Belmont, both of MA (US)

(73) Assignee: Mide Technology Corporation, Medford, MA (US)

( * ) Notice: Subject to any disclaimer, the term of this patent is extended or adjusted under 35 U.S.C. 154(b) by 0 days.

(21) Appl. No.: 09/686,745

(22) Filed: Oct. 10, 2000

Related U.S. Application Data

(63) Continuation-in-part of application No. 09/173,144, filed on Oct. 15, 1998, now Pat. No. 6,138,654.

(51) Int. Cl.[7] .................................................. F02P 3/12
(52) U.S. Cl. .................................... 123/642; 123/143 B
(58) Field of Search ........................... 123/642, 406.41, 123/406.43, 143 B; 315/55

(56) References Cited

U.S. PATENT DOCUMENTS

| | | | |
|---|---|---|---|
| 4,392,082 A | * | 7/1983 | Harada ........................ 315/55 |
| 4,767,967 A | * | 8/1988 | Tanaka et al. ................. 315/55 |
| 5,197,448 A | | 3/1993 | Porreca et al. ............... 123/620 |
| 5,715,801 A | * | 2/1998 | Murasawa et al. ........... 123/642 |
| 6,199,365 B1 | | 3/2001 | Pretorius et al. ........... 60/39.06 |

FOREIGN PATENT DOCUMENTS

| | | | | |
|---|---|---|---|---|
| FR | 2 367 199 | * | 9/1978 | .................. 123/642 |
| GB | 2 036 173 | * | 6/1980 | .................. 123/642 |
| JP | 62265466 | * | 11/1987 | .................. 123/642 |

OTHER PUBLICATIONS

Edwards, et al., "A Comparative Study of Plasma Ignition Systems", SAE Technical Paper Series, No. 830479, pp. 1–12, 1983.

Ziegler, et al., "Influence of a Breakdown Ignition System on Performance and Emission Characteristics", SAE Technical Paper Series No. 840992, pp. 1–13, 1984.

\* cited by examiner

*Primary Examiner*—Erick Solis
(74) *Attorney, Agent, or Firm*—Valarie B. Rosen; Choate, Hall & Stewart

(57) ABSTRACT

An improved spark ignition system. Pressure on a piezoelectric element results in a voltage that, when discharged across a spark gap, causes dielectric breakdown in a fuel air mixture. Additional current to power combustion is supplied by a capacitor circuit. The ignition system increases the combustion rate and decreases emissions of $NO_x$.

16 Claims, 15 Drawing Sheets

FIG. 4C
_PRIOR ART_

|  | BREAKDOWN % | ARC % | GLOW % |
|---|---|---|---|
| RADIATION LOSS | <1 | 5 | <1 |
| HEAT LOSS TO ELECTRODES | 5 | 45 | 70 |
| TOTAL LOSSES | 6 | 50 | 70 |
| ENERGY TRANSFERRED TO PLASMA | 94 | 50 | 30 |

# PIEZOELECTRIC IGNITION DEVICE FOR INCREASING SPARK ENERGY

This application is a continuation-in-part of and claims the priority of U.S. patent application No. 09/173,144, filed Oct. 15, 1998, now U.S. Pat. No. 6,138,654 the entire contents of which are incorporated by reference herein.

FIELD OF THE INVENTION

This invention pertains to ignition systems and, more particularly, to piezoelectric ignition systems in which a sustained spark is provided.

BACKGROUND OF THE INVENTION

The reduction of atmospheric $NO_x$ is a high priority as it contributes significantly to urban smog and other unwanted pollution, i.e., acid rain. Despite ongoing research and development efforts to reduce the emissions of the oxides of nitrogen ($NO_x$) from road surface vehicles, their engines still remain one of the largest producers of ozone forming pollutants in the world. Significant progress has been made to reduce the emissions from light trucks and passenger vehicles since the introduction of the Clean Air Act in 1990. However, even with today's standards, the EPA predicts that these vehicles will produce more than 40% of the ozone-forming pollutants in major cities by the year 2030.

New regulations recently issued by the EPA call for a reduction in $NO_x$ produced by new passenger vehicles to 0.07 grams per mile by 2007. This implies a reduction in $NO_x$ of 856,000 tons per year by 2007. Most of the technologies that will be implemented to achieve this goal have been demonstrated during the National Low Emissions Vehicle (NLEV) program. Although most are still in the research phase, it is postulated that the demonstrated technologies will have enough maturity to fulfill these emission requirements. However, the new regulations apply only to new vehicles. The vast majority of vehicles on the road is older and thus not subject to these new reductions.

Thus, it is desired to have a method of reducing emissions that can easily be integrated into older vehicles.

SUMMARY OF THE INVENTION

The invention described here presents an alternative to the reduction of $NO_x$ that can easily be integrated into existing vehicles and will extend the controllability of new engines. The invention enables extension of the lean burn limit of gasoline, an increase in the burning rate of gasoline and recycled exhaust gas concentration, and a reduction of cycle by cycle variations in the cylinder. All these factors combine to reduce the mass of $NO_x$ per horsepower that the engine delivers. The technology can be incorporated into both new automobiles and current spark ignition engines.

In one aspect, the invention is an ignition circuit. The circuit comprises a piezoelectric element, a capacitor, and a spark gap connected in parallel. The piezoelectric element generates a voltage sufficient to produce a spark to cause dielectric breakdown in a fuel-air mixture in response to an increase in the pressure of said mixture, and the voltage of a charge stored on the capacitor is sufficient to traverse the spark gap after dielectric breakdown. The capacitor may be charged by a DC power source, which may comprise an AC power source and a bridge rectifier. The AC power source may provide 12V, and the source of DC power may further comprise a 1:40 transformer. The circuit may comprise a plurality of capacitors in parallel with one another, and the piezoelectric element may comprise a plurality of sub-elements that combine to generate a voltage equal to the sum of the voltages developed by each sub-element. The charge stored on the capacitor may be sufficient to sustain a spark generated by the voltage from the piezoelectric element. The circuit may further comprise a timing circuit in electrical communication with the piezoelectric element, wherein spark timing is determined using voltage information from the piezoelectric element.

In another aspect, the invention is a method of igniting a spark. The method may comprise exerting pressure on a piezoelectric element to generate a voltage, placing the piezoelectric element in electrical communication with a spark gap, wherein the voltage across the piezoelectric element is sufficient to cause a spark across a spark gap, and directing current from a capacitor to the spark gap, wherein the current has sufficient energy to traverse the spark gap. The energy of the spark resulting from the voltage supplied by the piezoelectric element may be sufficient to ignite a fuel-air mixture, and the step of exerting pressure may comprise compressing the fuel-air mixture. The spark voltage supplied by the piezoelectric element may have a voltage at least a factor of 10, 50, 100, 1000, or 4000 greater than the spark voltage supplied by the capacitor.

In another aspect, the invention is a method of increasing energy delivery to a fuel-gas mixture. The method comprising causing dielectric breakdown in the fuel-gas mixture, thereby reducing impedance of the mixture and supplying current having a voltage sufficient to bridge a spark gap through the reduced impedance mixture.

BRIEF DESCRIPTION OF THE DRAWINGS

The invention is described with reference to the several figures of the drawing, in which.

FIG. 4C is a table showing the energy distribution for breakdown, arc, and glow discharge during spark generation (Heywood);

DETAILED DESCRIPTION

The cycle of a four-stroke engine is divided into four phases: (i) exhaust, (ii) intake, (iii) compression, (iv) expansion (power). The invention can also be used in two-stroke engines, in which the exhaust and intake strokes are combined with the compression and expansion strokes, respectively. During the compression stroke, the fuel-air mixture that had been taken into the cylinder during the intake cycle is compressed by reducing the volume of the cylinder. The pressure inside the cylinder rises as the volume is decreased.

Figure 1A:
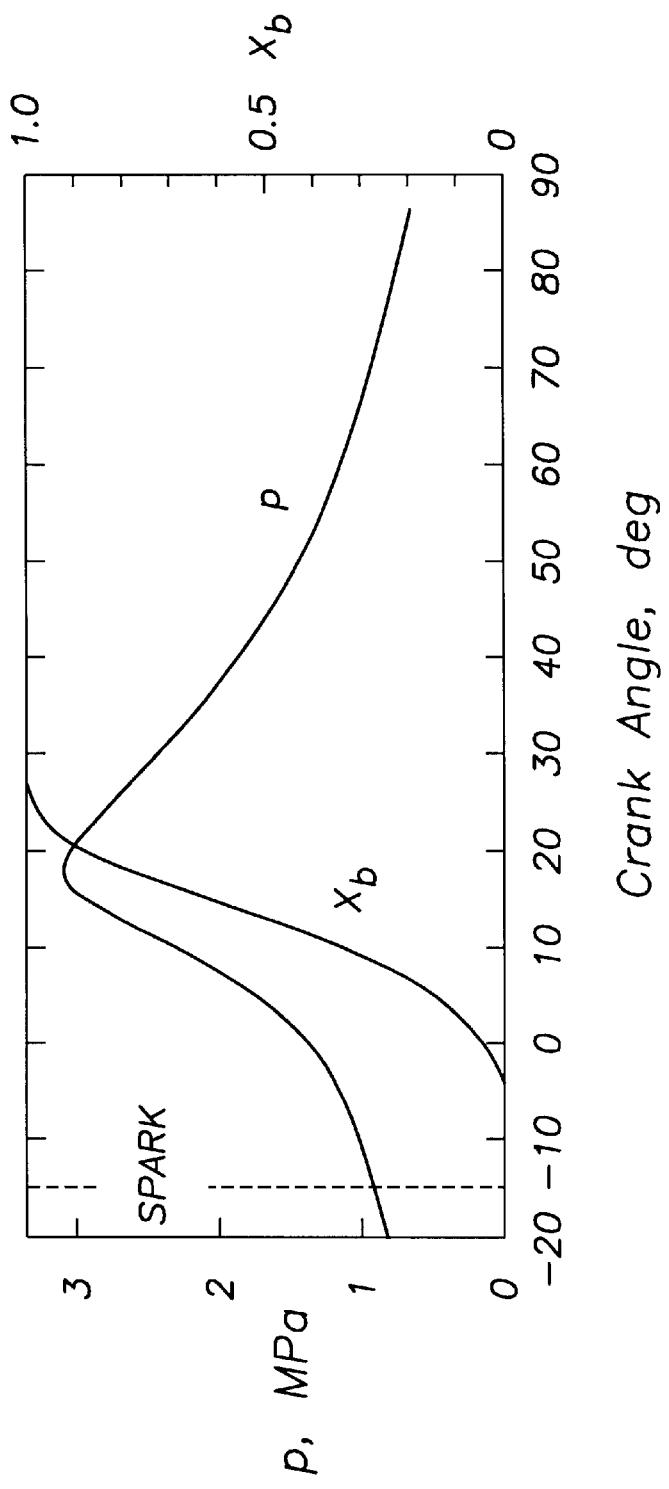
FIG. 1A is a graph showing the variation of pressure (p) and mass fraction burned ($x_b$) with crank angle (J. B. Heywood, "Internal Combustion Engine Fundamentals," McGraw-Hill Series in Mechanical Engineering, 1988)

After the fuel-air mixture has been compressed, it is ignited by a spark provided by the spark plug. In a conventional engine, the timing of the spark is controlled by the distributor. In an engine incorporating the ignition circuit of the invention, timing is partially controlled by a piezoelectric element in the spark plug, as disclosed in our co-pending application Ser. No. 09/173,144, filed Oct. 15, 1998. The increased pressure in the cylinder imparts mechanical strain on the piezoelectric element, causing a voltage across its poles sufficient to produce a spark across a spark gap in the plug, igniting the fuel air mixture. As shown in FIG. 1A, after the spark, the pressure in the cylinder continues to increase, albeit at a higher rate.

Figure 1B:
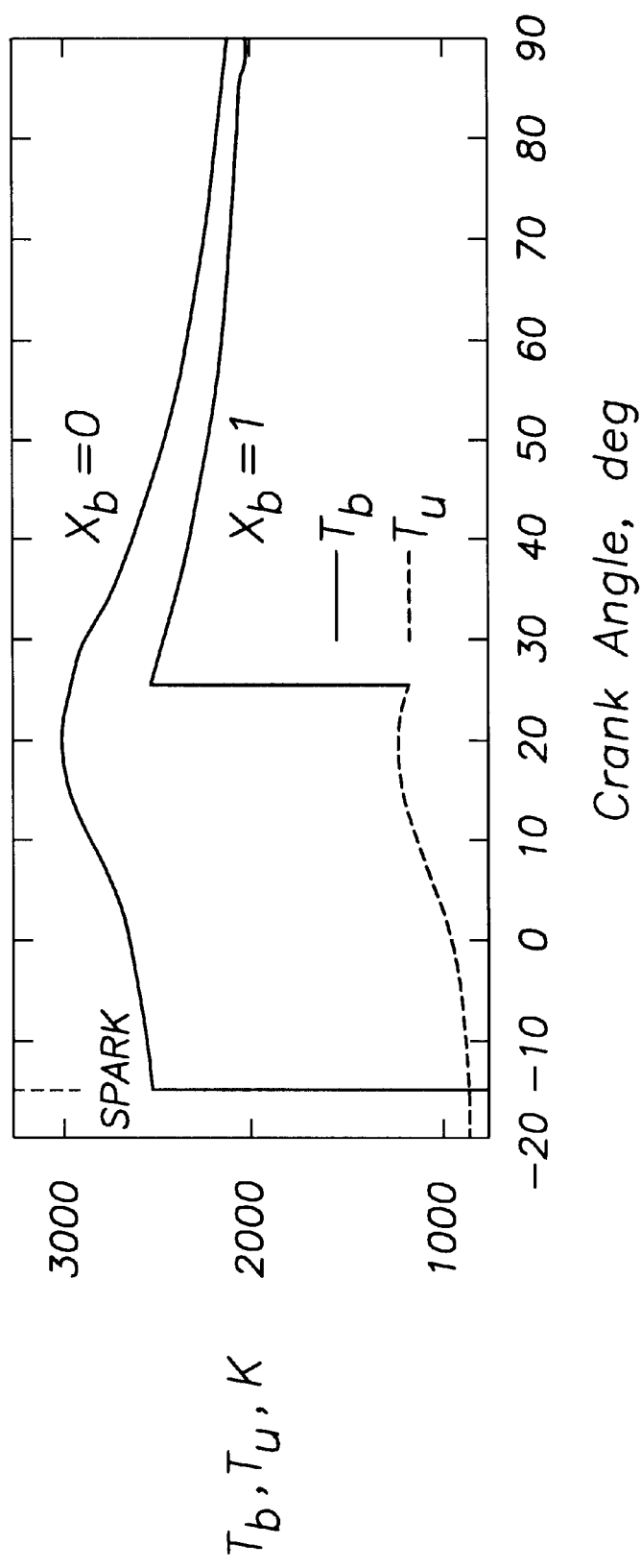
FIG. 1B is a graph showing the temperature profile of the fuel-air mixture versus crank angle ($x_b$=0 refers to the fraction of the mixture at the beginning of combustion (discharge); $x_b$=1 refers to the fraction of the mixture that burns at the end of combustion) (Heywood)
Figure 1C:
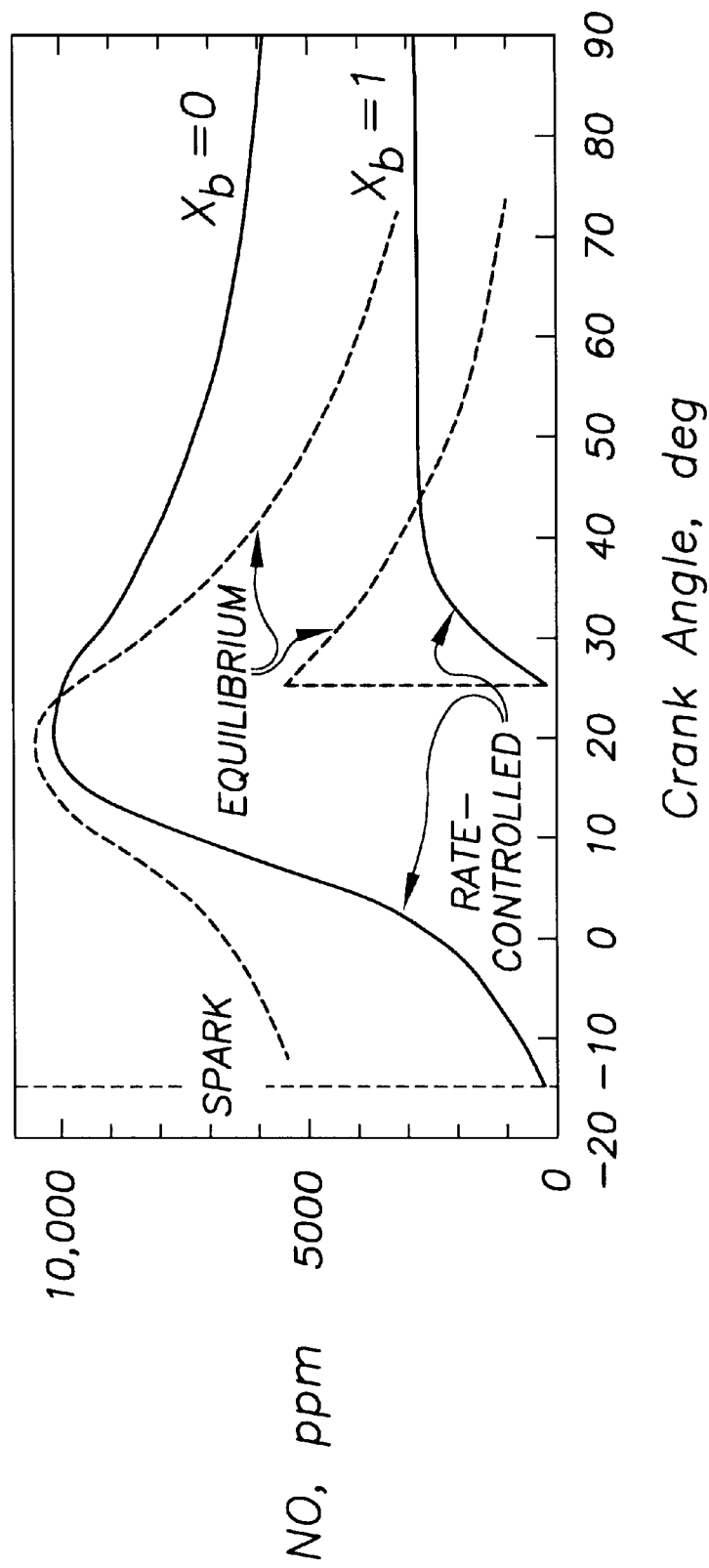
FIG. 1C is a graph showing NO production as a function of crank angle (Heywood)

The temperature in the cylinder is the primary factor influencing the production of $NO_x$ production. $NO_x$ includes both NO and $NO_2$, but the ratio of $NO_2$ to $NO_x$ is negligibly small, about 2%. Most experiments record NO and $NO_2$ together as $NO_x$, but models describing the generation of NO-based gases only utilize NO. FIG. 1B shows the calculated temperature profile for the burned ($x_b=0$) and unburned ($x_b=1$) fuel-air mixture. When timing is optimized, the maximum temperature is achieved about 20 CAD ATC (crank angle degrees after top center). This results from further compression of the early burned gas as the pressure increases following the spark (maximum pressure is at 15 CAD ATC under optimal conditions), which results in a temperature increase in the compressed gas. FIG. 1C demonstrates that the bulk of the NO is produced at about the same time. As the temperature falls, the NO concentration in the burnt mixture decreases according to about the same profile. FIG. 1C illustrates theoretical concentrations of NO in the combusted fuel-air mixture according to two different models. The equilibrium model assumes that the chemical relationship $$2N+O_2 <=> 2NO \qquad (1)$$

Figure 2:
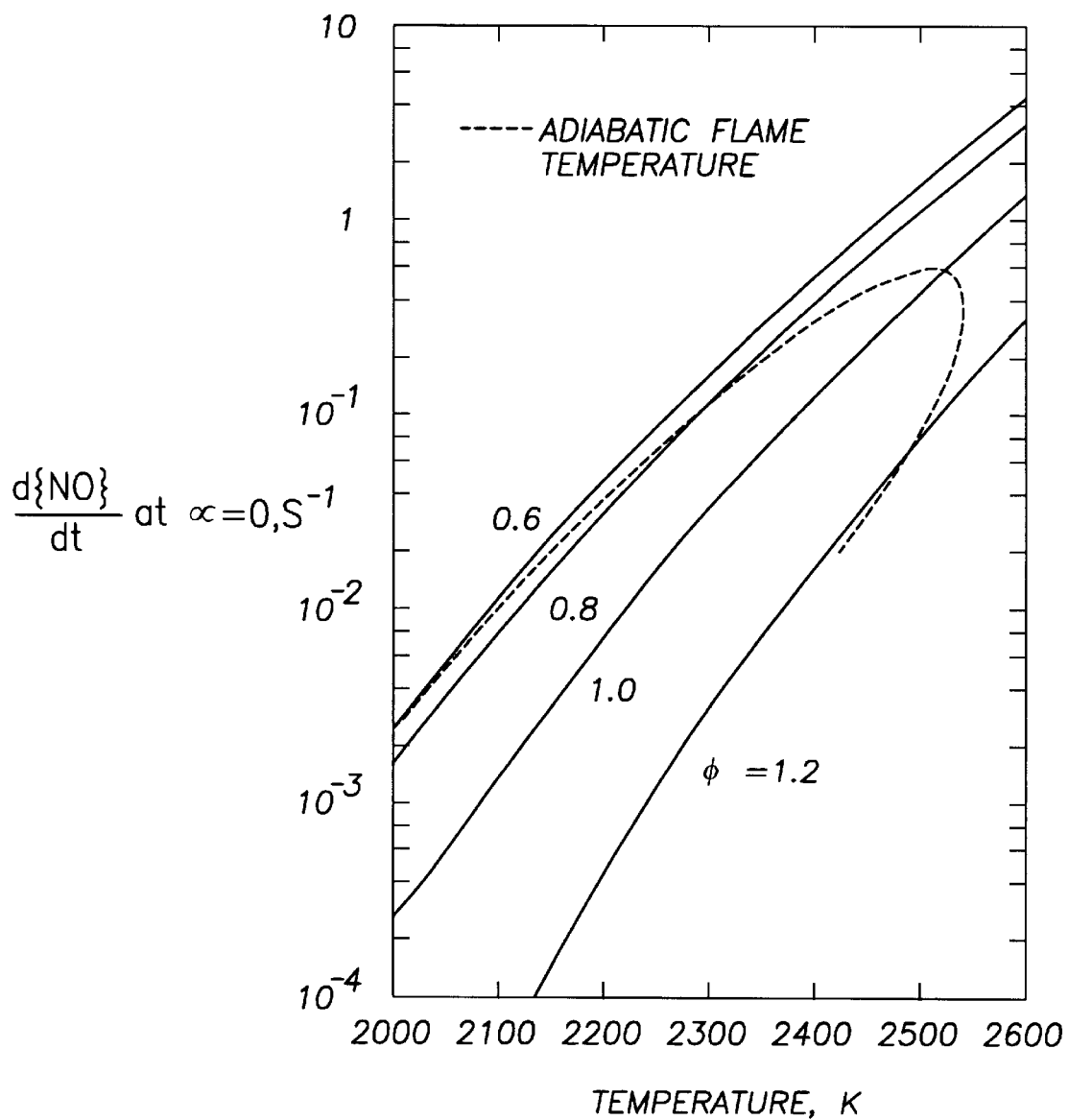
FIG. 2 is a graph illustrating the effect of temperature and relative fuel-air ratio $\phi$ on the production rate of NO (Heywood)

is always at equilibrium (nitrogen is monatomic at elevated temperature), and the rate-controlled model assumes that there is a constant force favoring either the forward or backward reaction, depending on the temperature, as shown in FIG. 2. For example, NO may be removed from the system by the reaction $$NO+O_2 \rightarrow NO_2+O° \qquad (2)$$

The oxygen radical can react with nitrogen (monatomic or diatomic) to form NO.

Elevated temperatures also increase the rate of $NO_x$ production. FIG. 2 illustrates the dependence of NO production on temperature for several fuel-air ratios φ. The dotted line indicates the adiabatic flame temperature for a given fuel-air ratio. The NO production rate increases logarithmically with temperature. As a result, efforts to decrease the production of $NO_x$ by internal combustion engines have focused on reduction of combustion temperatures.

Figure 3:
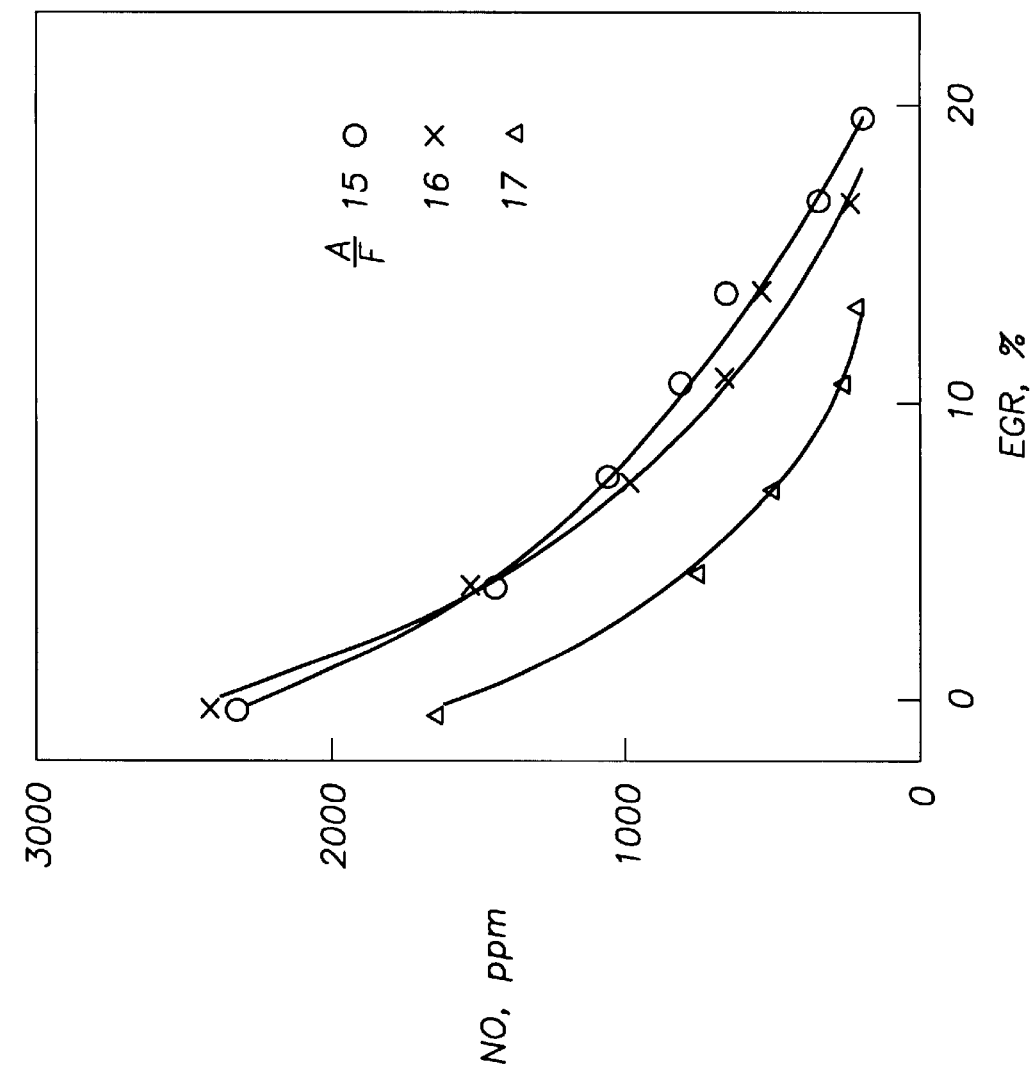
FIG. 3 is a graph illustrating the effect of exhaust gas recycling and air-fuel ratio on the production of NO (Heywood)

The technique most widely used to reduce the combustion temperature is Exhaust Gas Recycling (EGR), reuse of a portion of the exhaust gas in subsequent combustion cycles. The amount of EGR is controlled by valve timing or special valves. Increased EGR (measured as the mass fraction in the fuel-air mixture) increases the heat capacity of the mixture, increasing the energy required to raise the temperature. The cooler mixture reduces the production of $NO_x$. FIG. 3 demonstrates the relationship between EGR and NO production for several air-fuel ratios. However, excessive use of EGR may cause the engine to operate outside of its stable operating limit by decreasing the temperature of the system, reducing the amount of energy available to the fuel to a point where sustainable combustion is not possible.

A second way to decrease the production of $NO_x$ is to increase the burning rate of the mixture, thereby reducing the time available to the mixture to produce $NO_x$. The rate of production of $NO_x$ is temperature dependent (FIG. 2); thus, reducing the time at which the mixture is held at an elevated temperature will result in reduced $NO_x$ production. The burning rate can be increased by increasing the rate at which energy is delivered to the fuel-air mixture.

A third way to control efficiency and emissions is thorough proper engine control. The effectiveness of controllers and sensors is limited by the inherent cycle by cycle variation of the combustion process in a spark ignition (SI) engine. This variation is caused primarily by local variations (mixture composition, velocity and density) at the spark plug at time of discharge. However, such variations result in variation of the combustion efficiency. The inability of current spark ignition systems to deliver high energy over short times to the spark gap sensitizes the combustion to these local variations and thus results in large variations from cycle to cycle.

Production of NO can also be decreased by increasing the horsepower supplied by the engine, reducing the mass of $NO_x$ per generated horsepower. If the ignition spark is timed to occur closer to TC, the system spends less time working against the pressure of the flame and expanding gasses. In addition, the mixture burns faster, reducing the time for generation of $NO_x$. Once the spark is generated, the fuel/air mixture begins to expand; however, the piston is still in its compression stroke and must work against the force of the expanding fuel/air mixture to complete the compression. By moving spark timing closer to TC, more of the energy of the fuel/air mixture is released after TC, during the expansion stroke. Thus, less energy must be expended to pump against the mixture. The energy expended before TC reduces the efficiency of the engine because the engine has to expend energy on its own fuel rather than directing energy to the other systems of the vehicle. After TC, the burning fuel/air mixture does work on the piston rather than the reverse.

Use of Breakdown and Arc Phase Ignition

Figure 4A:
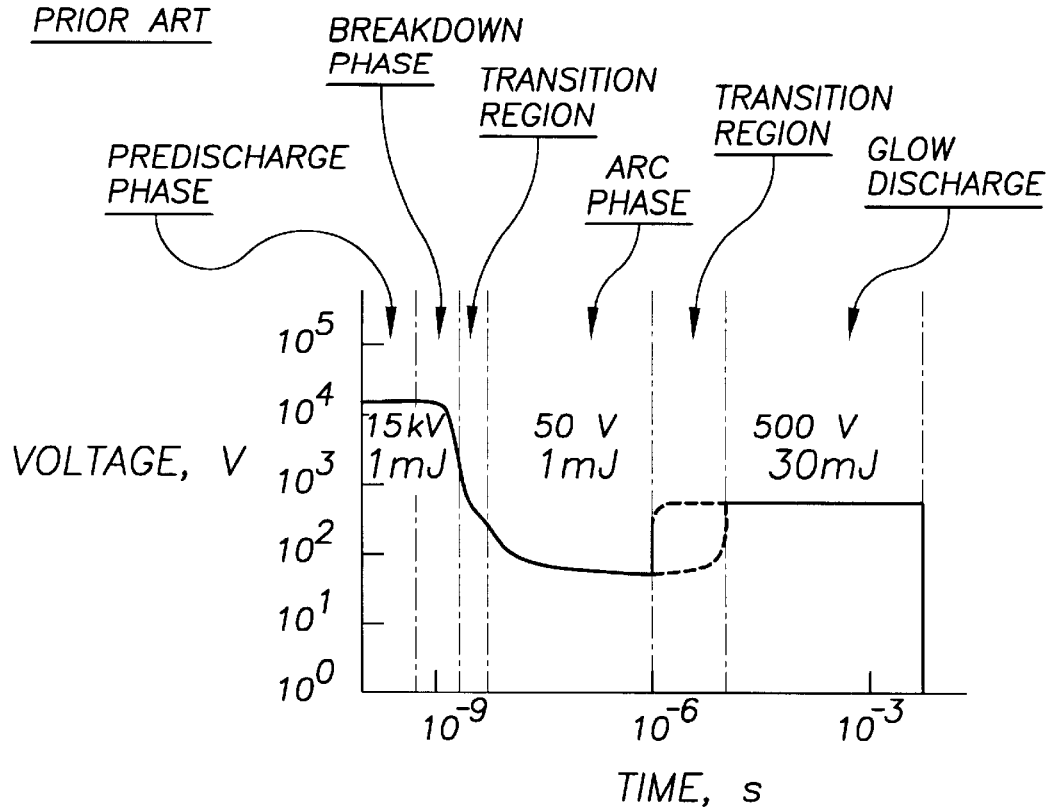
FIG. 4A is a graph illustrating the variation of voltage with time for a conventional coil spark-ignition system (Heywood)
Figure 4B:
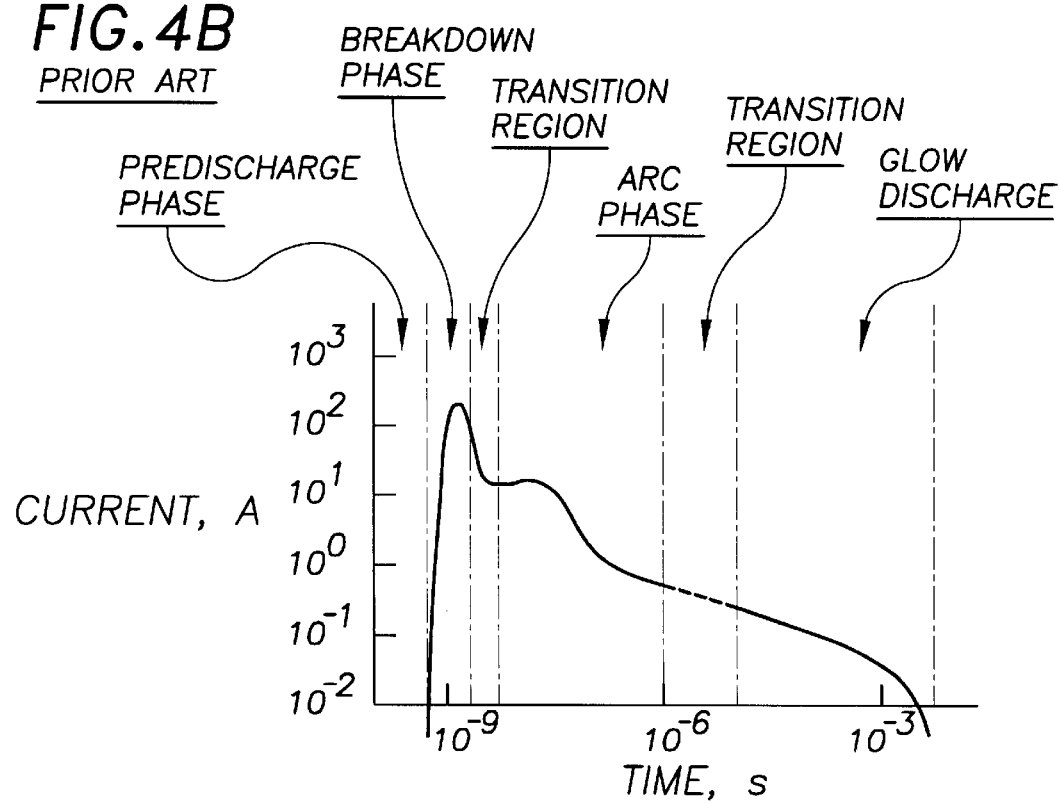
FIG. 4B is a graph illustrating the variation of current with time for a convention coil spark-ignition system (Heywood)

FIGS. 4A and 4B describe the different phases of spark propagation between the electrodes. FIGS. 4A and 4B show the amount of energy and current delivered to the spark gap during spark generation. There are three distinct areas of ignition: breakdown, arc and glow discharge. While the current across the gap is relatively high during the breakdown phase, the subsequent current delivery to the gap decreases rapidly during the arc and glow discharge phases, with a concurrent decrease in energy transfer efficiency, as shown in FIG. 4C. Current coil ignition systems deliver most of their energy to the spark gap during the glow discharge phase. This is the most inefficient of the three phases; only a fraction (30%) of the energy delivered to the spark plug gap is actually transferred to the plasma. However, the efficiency of the ignition device could be increased if all the available energy was delivered to the electrodes during the breakdown and arc phase, during which energy transfer is more efficient. There have been a number of studies into the effects and benefits of delivering more electrical energy to the plasma during ignition, especially during the breakdown phase (Heywood, Ziegler, Edwards).

Figure 5A:
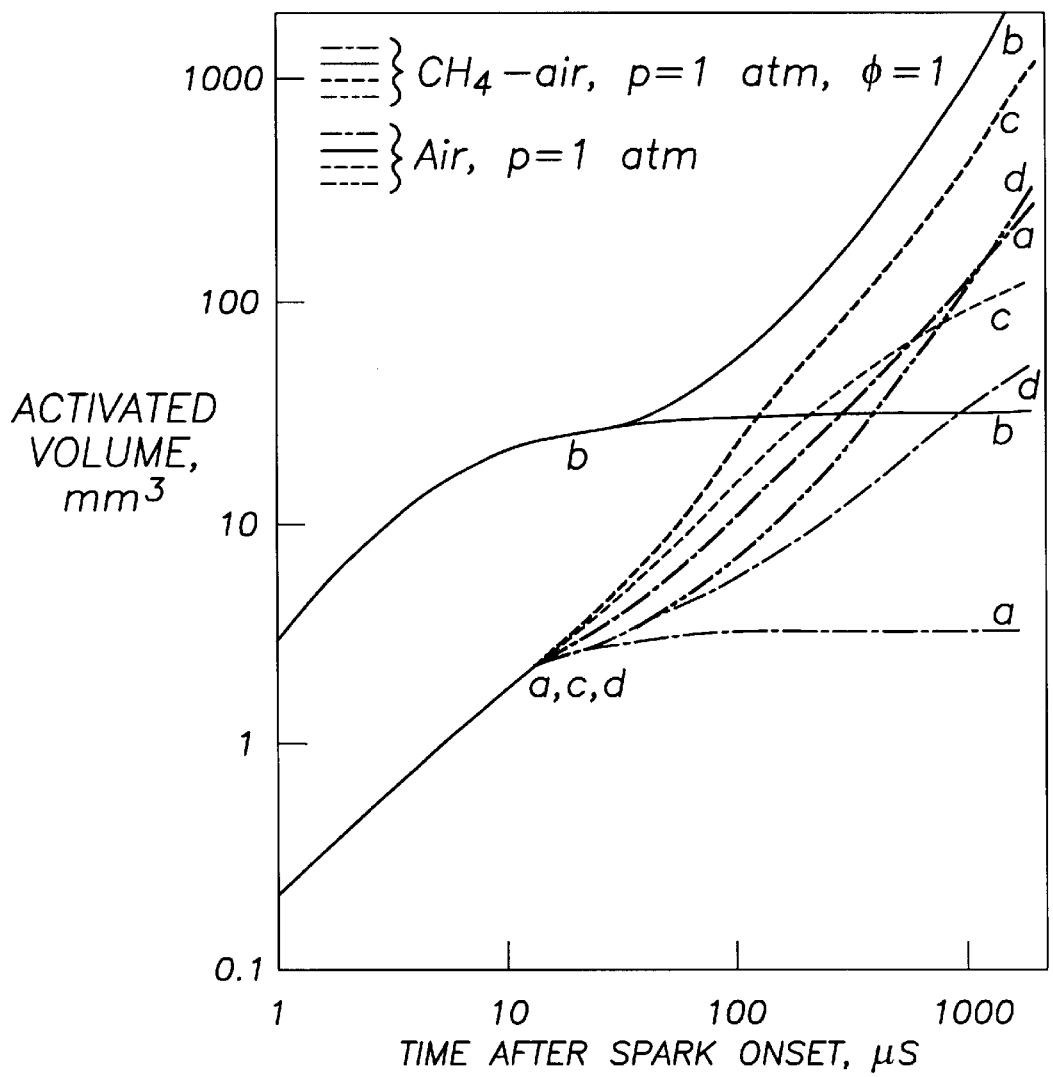
FIG. 5A is a graph showing the activated volume as a function of time for several types of discharge in both air and a methane-air mixture at I atm (bold lines—methane-air mixture; lighter lines—air; a: captive discharge, 3 mJ, 100 $\mu$s duration; b: 30 mJ breakdown discharge, 20 ns duration; c: captive discharge plus 30 mJ arc, 500 $\mu$s duration; d: captive discharge plus 30 mJ glow discharge, 2 ms duration) (Heywood)

Because of the high efficiency of the delivery of the electrical energy to the plasma, breakdown ignition has a significant influence on the speed and size of the initial flame kernel. FIG. 5 illustrates the volume and radius of the activated volume within the flame front for a variety of ignition conditions. FIG. 5A demonstrates that breakdown ignition (b) results in faster formation of a larger activated volume in a methane-air mixture than captive discharge, in which charge is stored on a capacitor before being stepped up for distribution to the spark plug. The larger volume results in an increased combustion rate, as discussed below. With breakdown and arc phase ignition, the volume of the flame is two orders of magnitude larger than that of the glow discharge ignition with the same total energy (FIG. 5A). For the methane-air mixture, delivering an order of magnitude lower energy (3 mJ) in 100 $\mu$s produces the same result as delivering 30 mJ in 2 ms. An increase in plasma energy during ignition also extends the lean operating limit of the engine, as discussed below.

Figure 5B:
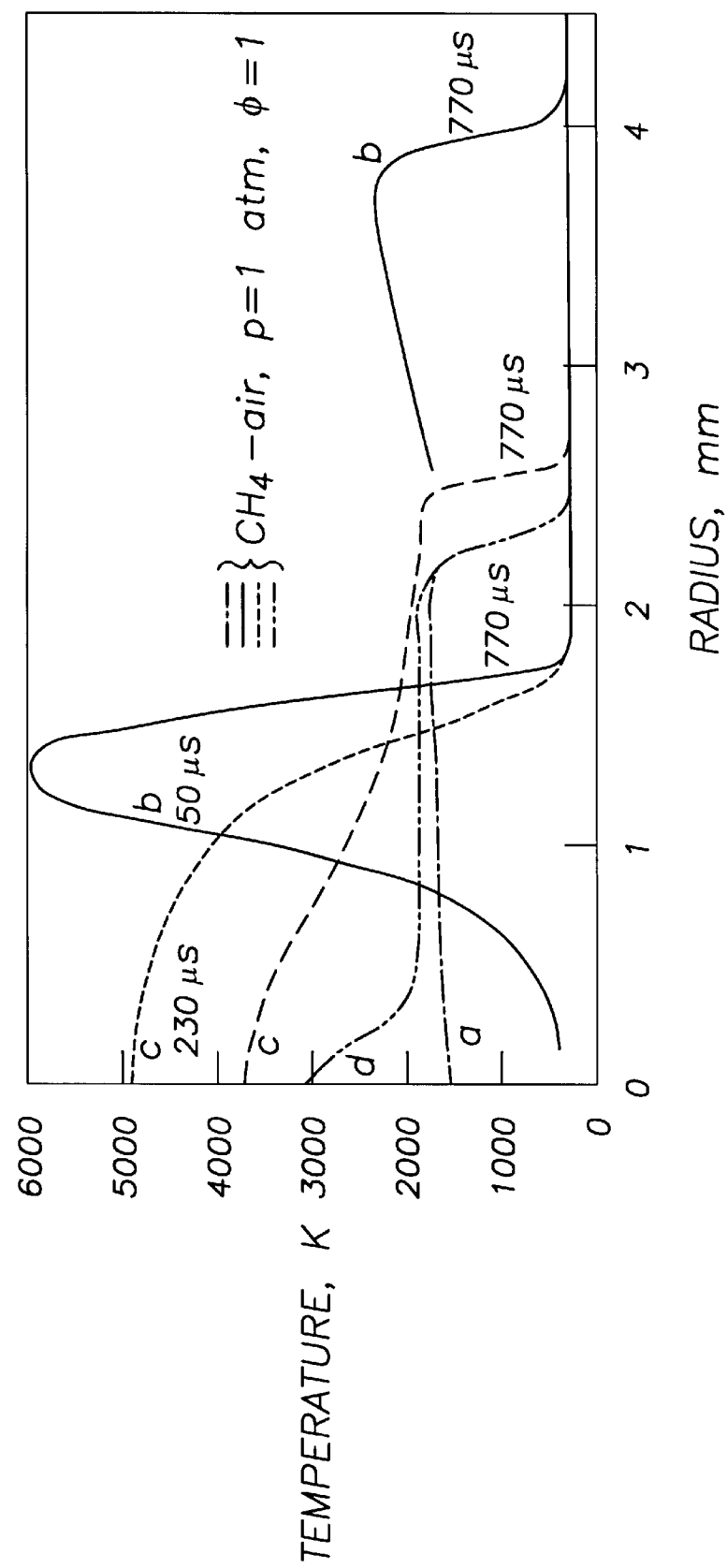
FIG. 5B is a graph showing the variation of temperature with the radius of the activated volume at specified times for several types of discharge in a methane-air mixture at 4 atm (a: captive discharge, 3 mJ, 100 μs duration; b: 30 mJ breakdown discharge, 20 ns duration; c: captive discharge plus 30 mJ arc, 500 μs duration; d: captive discharge plus 30 mJ glow discharge, 2 ms duration) (Heywood)

FIG. 5B demonstrates that the breakdown ignition system (b) will produce the biggest flame for a given amount of total energy. FIG. 5B is a temperature profile of the activated volume at various times following spark onset. Lines a and d illustrate that increasing the energy by an order of magnitude has no effect on plasma size if the extra energy is supplied via glow discharge ignition, i.e., a conventional ignition system. In contrast, the plasma size is increased by an order of magnitude if the same amount of energy is delivered in 100 $\mu$s (c).

The following equation directly relates the flame size to the rate of combustion:

$$\frac{dm_b}{dt} = A_f \rho_u S_T \quad (3)$$

where $A_f$ is the flame area, $\rho_u$ the unburned mixture density and $S_T$ the turbulent flame speed, the vector sum of the local turbulence at edge of flame and the laminar flame speed. The turbulent flame speed increases with engine speed, and the unburned mixture density is almost constant through the combustion process. Thus, the rate of combustion is almost entirely regulated by the flame area at a given operational speed. Increasing this area by increasing the energy delivered to the plasma will increase the combustion rate, reducing both the time the fuel-air mixture is held at an elevated temperature and $NO_x$ production. Referring to FIG. 5B, breakdown ignition results in the largest flame area after 770 $\mu$s, increasing the combustion rate with respect to traditional glow discharge ignition.

Figure 6A:
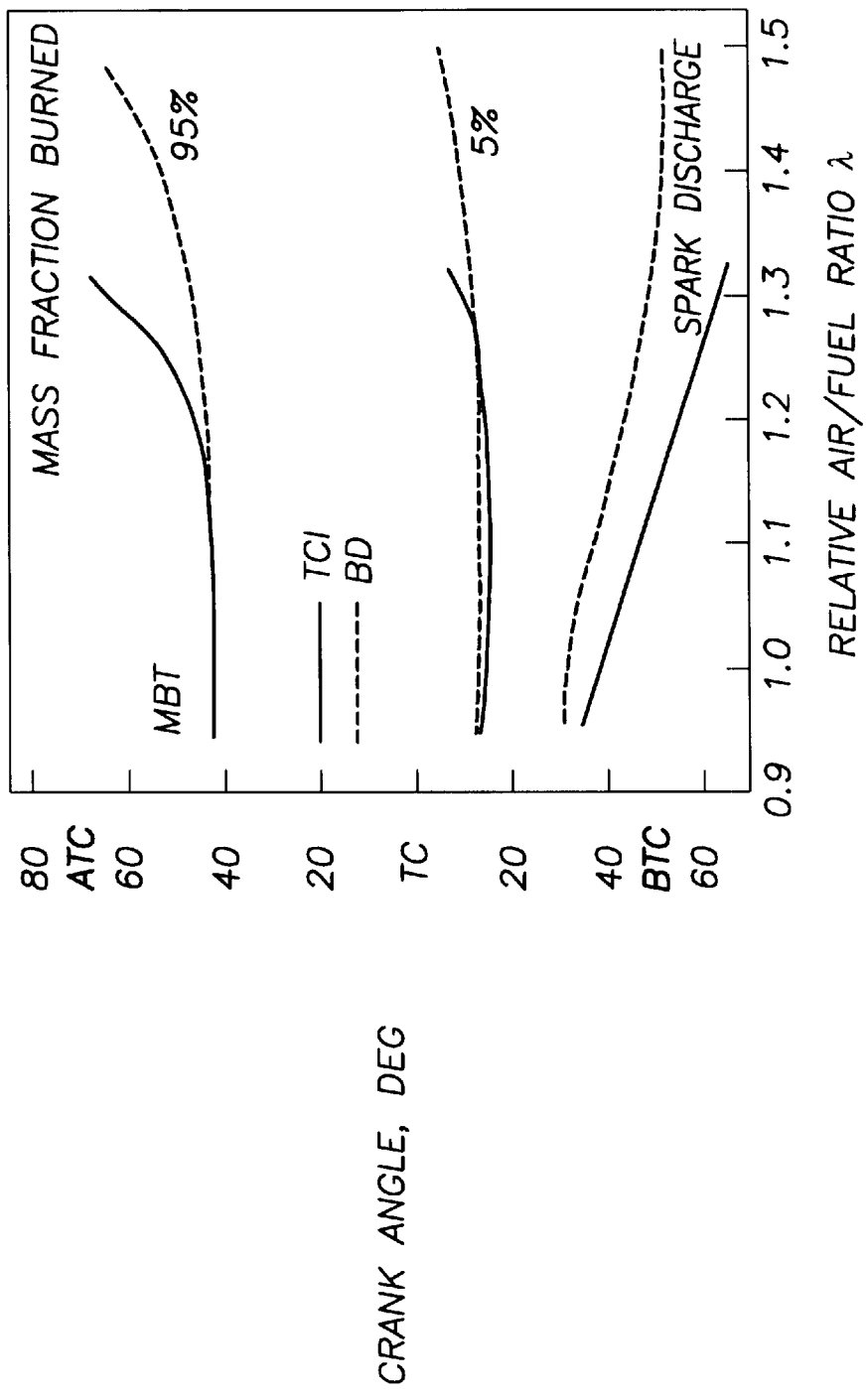
FIG. 6A is a graph illustrating the effect of breakdown ignition (BD; 43 mJ, 10 ns duration) and conventional transistorized coil ignition (TCI: 43 mJ, 2 ms duration) on spark timing, burn rate, and the mass fraction burned with respect to the air-fuel ratio λ (timing optimized to MBT—maximum brake torque) (G. F. W. Ziegler, et al., "Influence of a Breakdown Ignition System on Performance and Emission Characteristics," SAE Paper #840992)
Figure 6B:
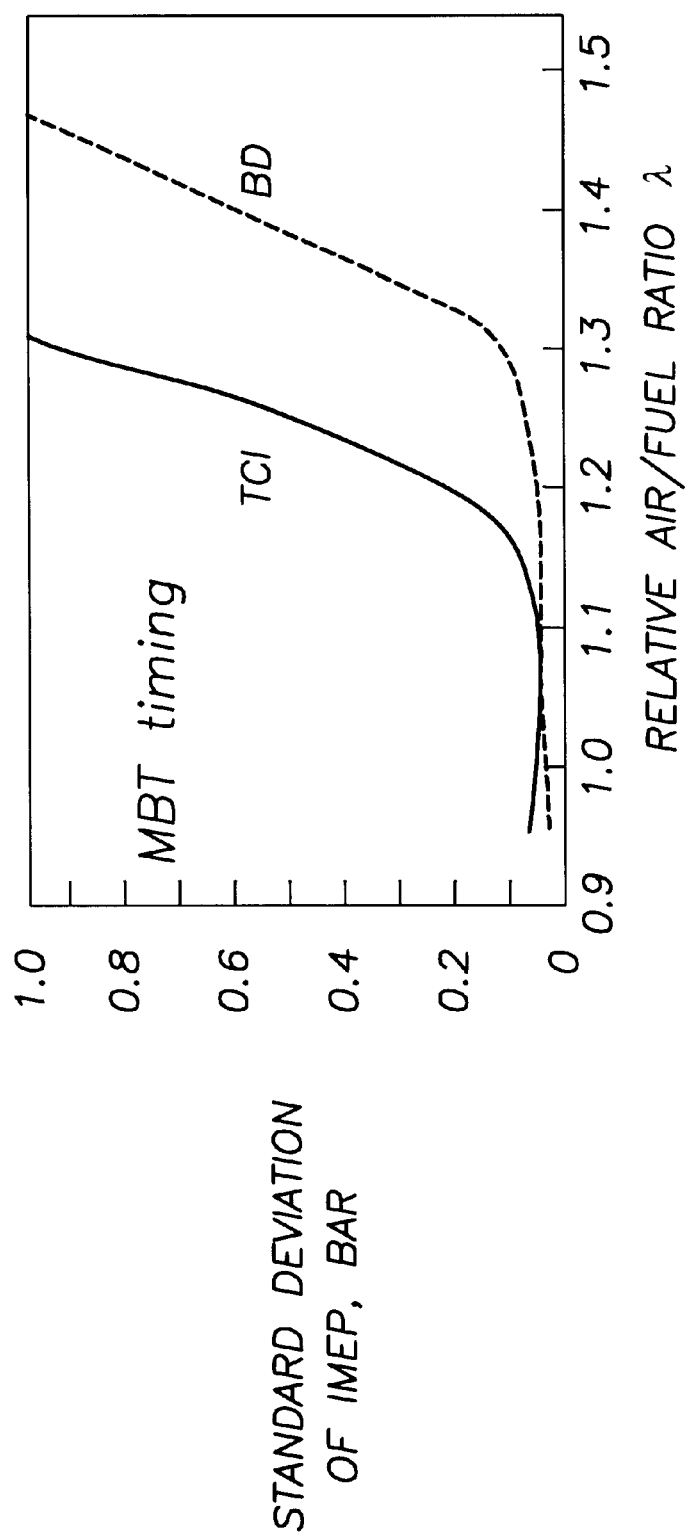
FIG. 6B is a graph illustrating the standard deviation of the indicated mean effective pressure (IMEP) as a function of the air-fuel ratio for TCI and BD systems (Ziegler)

FIG. 6A demonstrates the effect of delivering more energy in less time to the plasma on the burn rate. FIG. 6A indicates the crank angle at which $x_b$, the mass fraction burned, is 0.05 and 0.95 for various air-fuel ratios $\lambda$. Breakdown discharge results in effective combustion of the air-fuel mixture, even for relatively lean mixtures. The mixture burns faster throughout the air-fuel spectrum with breakdown ignition (BD), resulting in a larger spark retard. In addition, the spark can be discharged closer to TC (top center, maximum compression) and the fuel-air mixture is 95% consumed at the same time (with respect to crank angle) or earlier than for a traditional ignition system. As the ignition timing approaches TC, the temperature of the mixture is increased, reducing cycle-by-cycle variation and increasing the efficiency of controllers (see above). As the mixture becomes more lean (increased air-fuel ratio), the benefit of the breakdown ignition system is apparent. FIG. 6B illustrates the variation of mean effective pressure with the air-fuel ratio. For leaner mixtures ($\lambda>1.1$), the faster energy delivery enabled by breakdown ignition reduces pressure variation, decreasing the variation in combustion efficiency and increasing the lean operating limit, thereby increasing combustion efficiency and reducing emissions.

Figure 7B:
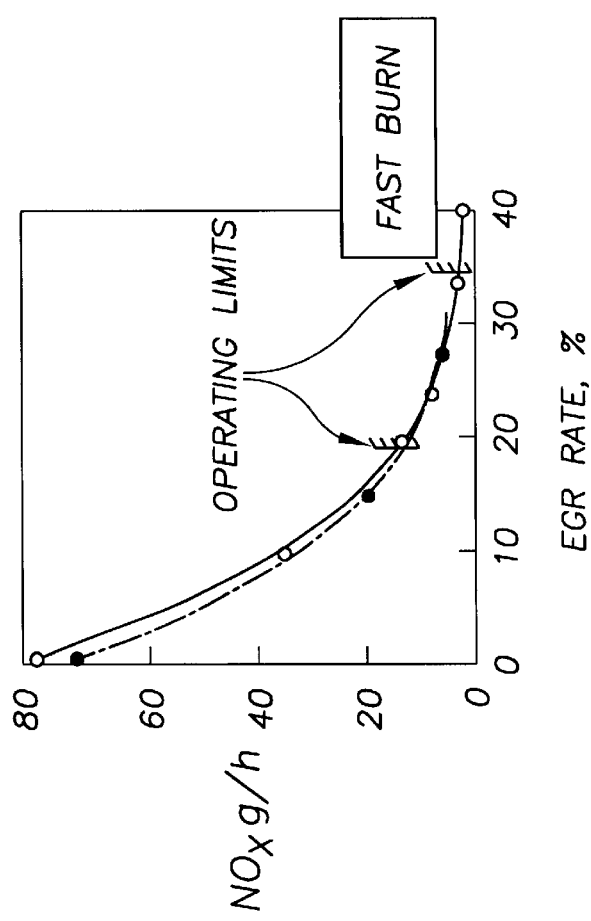
FIG. 7B is a graph illustrating the variation of $NO_x$ emissions with exhaust gas recycling as a function of burn rate (Edwards)
Figure 7A:
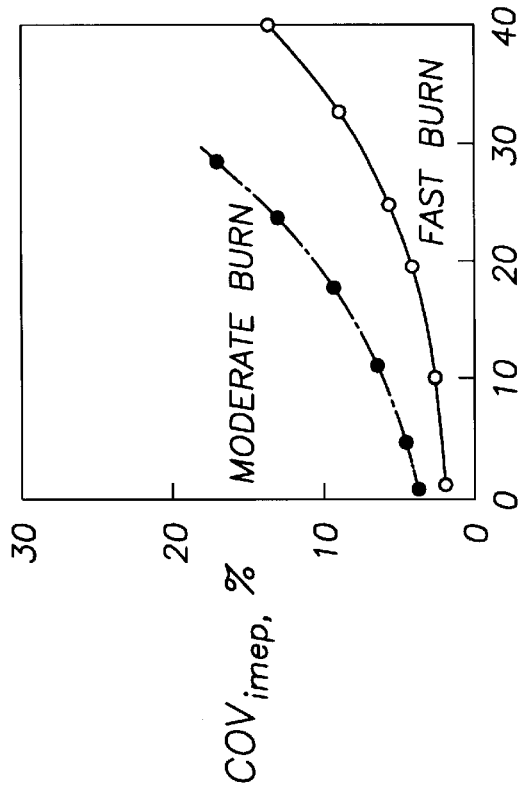
FIG. 7A is a graph illustrating the variation of IMEP with respect to exhaust gas recycling as a function of burn rate, (C. F. Edwards and A. K. Oppenheim, "A Comparative Study of Plasma Ignition Systems," SAE Paper #830479)

The faster burning rate decreases the coefficient of variance of the mean effective pressure (FIG. 7), reducing cycle by cycle variation and enabling better engine control. FIG. 7A demonstrates that a faster burning rate reduces the variation of IMEP for a given EGR. FIG. 7B illustrates that increasing the EGR decreases the production of NO; however, the EGR is limited by the operating limit of the engine, which is increased with a faster burning rate (FIG. 7B). Increased combustion energy directly permits an increase in EGR by providing additional energy to the fuel-air mixture for combustion, increasing the permitted concentration of exhaust at which the mixture can ignite. Thus, the use of EGR may be optimized to minimize $NO_x$ generation without jeopardizing engine stability.

Figure 8:
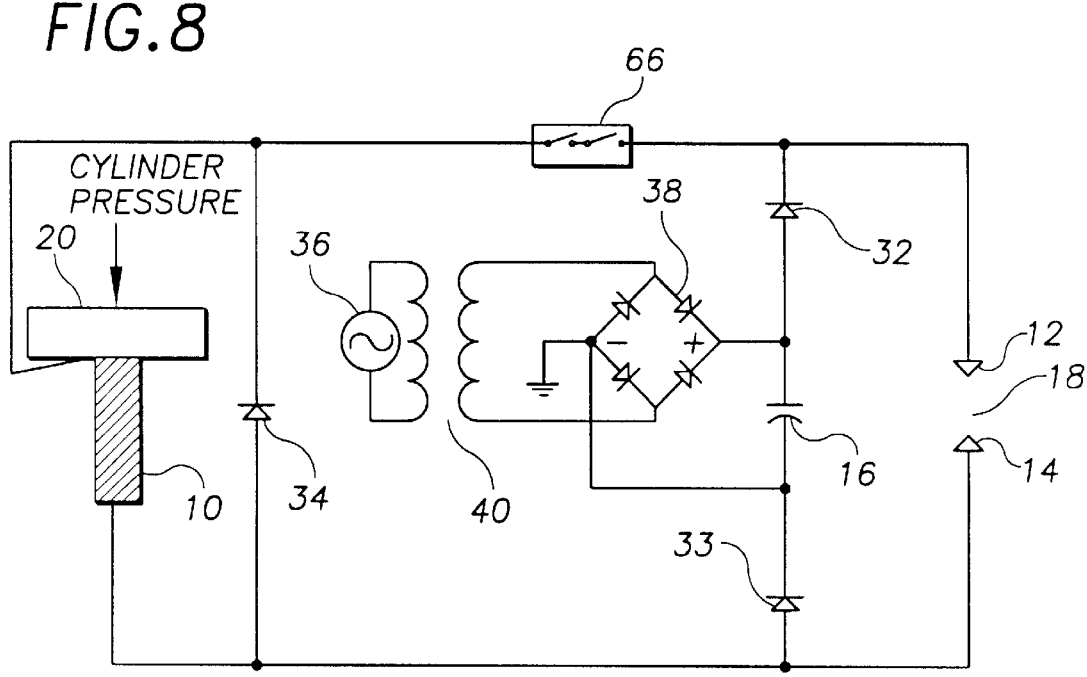
FIG. 8 is a schematic of an ignition system according to the invention.

The device of the invention relies on the pressure in the cylinder to strain a piezoelectric element 10 and generate the high voltage required to cause the breakdown of the material between spark plug electrodes 12 and 14 (FIG. 8). Once the fuel-air mixture is broken down, its impedance drops rapidly, allowing for the transfer of current at much lower voltages (FIG. 4). This allows capacitor 16 to discharge its high energy current to the spark gap 18. Thus, a low energy, high voltage device is used to break down the gap, while the high energy to sustain combustion is delivered at a lower voltage, which may be between about 50 and 800V.

The invention exploits the piezoelectric effect for operation. This effect was discovered in the late 1800's and is defined as polarization of electrical charge resulting from mechanical strain. The polarization is proportional to the strain. A number of piezoelectric materials are suitable for use with the invention, including, but not limited to, lead zirconate titanate-based materials in both polycrystalline and single crystal form.

Figure 9:
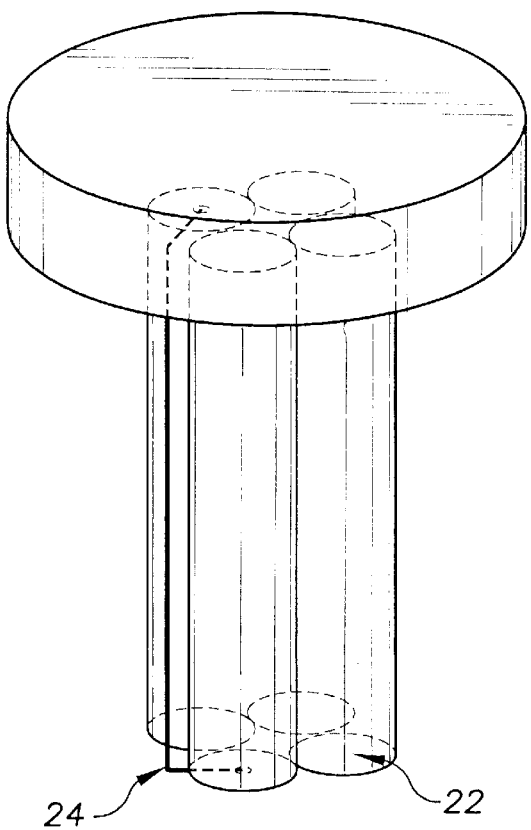
FIG. 9 is an illustration of four piezoelectric elements connected end-to-end in series with one another.

As a first order approximation, the voltage developed across a piezoelectric element in an ignition circuit can be written as $$V = \left(P\frac{A_{pressureplate}}{A_{piezo}}\right)g_{33}l \quad (4)$$

where V represents voltage, P represents cylinder pressure, $A_{piezo}$ represents the cross-sectional area of the piezoelectric element, $A_{pressure\ plate}$ represents the cross-sectional area of a plate 20 transmitting pressure to the piezoelectric element, $g_{33}$ represents the piezoelectric constant of the element material in the pole direction, and l represents the effective length of the element. The quantity in parentheses represents the stress on the piezoelectric element, as discussed in U.S. patent application Ser. No. 09/310,692, filed May 7, 1999, the entire contents of which are incorporated herein by reference. The effective length of the element can be increased by wiring multiple elements in series, as illustrated in FIG. 9, which shows a piezoelectric element comprising four piezoelectric subelements 22 wired end-to-end 24 and electrically insulated from one another. The series arrangement of multiple elements is equivalent to a piezoelectric element as long as the total length of the multiple elements. In addition, the piezoelectric element may also be protected from the heat of the combusting fuel by a heat shield.

The piezoelectric element provides the charge for the spark. As gases are compressed in the cylinder, the piezoelectric element 10 strains, developing a voltage of about +/−20 kV across its poles. The piezoelectric element 10 is designed so that the voltage developed during a normal compression cycle is sufficient to create a spark between the electrodes 12 and 14 of spark gap 18. Thus, the mechanical energy of the combustion gases is converted to electrical energy, which is used to decompose the fuel-air mixture to release chemical energy which is converted into mechanical energy to move a vehicle.

The spark generated by the piezoelectric element reduces the impedance of the fuel-air mixture in the cylinder, enabling capacitor 16, connected in parallel with piezoelectric element 10 and spark gap 18, to discharge across the spark gap 18 and provide additional electrical energy to the combusting mixture. The energy delivered by the capacitors is described by:

$$E = 1/2C[(V_{start})^2 - (V_{end})^2] \quad (5)$$

where C is the capacitance and $V_{start}$ and $V_{end}$ are the voltage at the beginning and end of the discharge. The voltage and capacitance should be optimized to minimize damage to the electrodes due to excessive energy while increasing $V_{start}$ to maximize the energy delivered during breakdown ignition. The capacitance is preferably between 0.5 μF and 17 μF. Diodes 32, 33, and 34 ensure that current from the piezoelectric element and the capacitor will circulate in the same direction. The capacitor may receive power from an AC power source 36 such as an alternator or a wall socket. The current is then passed through rectifier 38 before charging the capacitor. In addition, the voltage of the power supply may be stepped up with a transformer 40 to increase the voltage stored in the capacitor before it is passed through the rectifier. For example, 12V power may be stepped up by a factor of 40.

Figure 10:
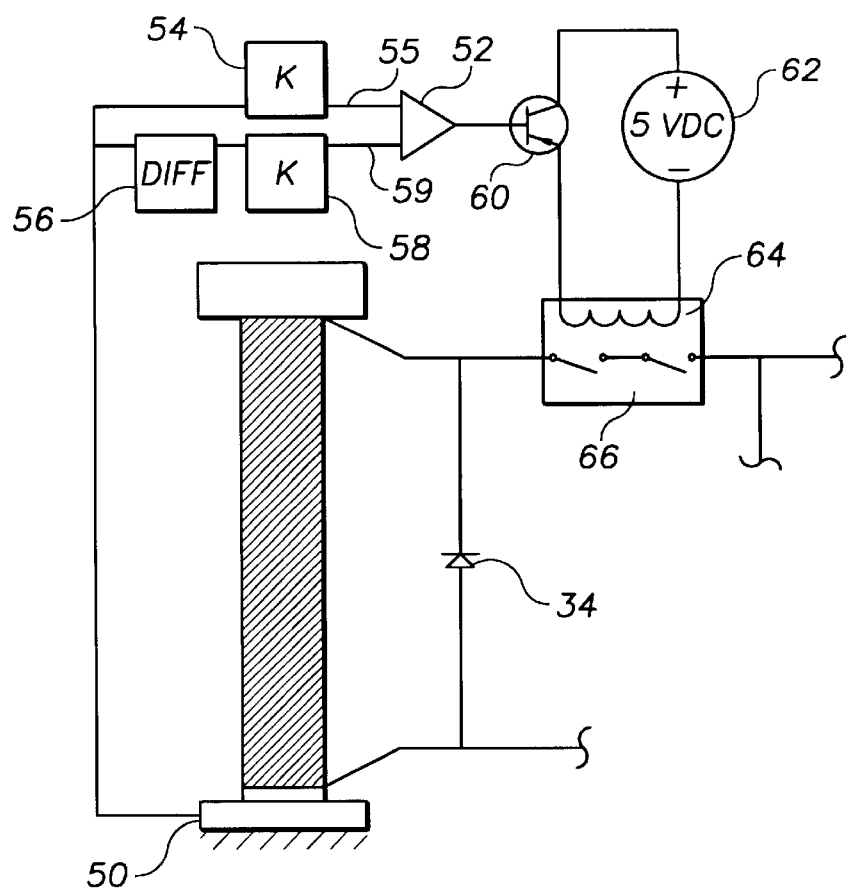
FIG. 10 is a schematic of an exemplary timing control circuit for use with the invention.

Ignition timing is determined by the pressure on the piezoelectric element 10 and by the rate of change of that pressure (FIG. 10). A low voltage piezoelectric sensor 50 connected to the piezoelectric element 10 provides a voltage reading to two inputs of a logic circuit or other controller 52. The sensor 50 is electrically isolated from the piezoelectric element 10 but not mechanically isolated. Thus, it is subject to the same strain imparted by the cylinder pressure on piezoelectric element 10. The voltage reading is split, and one signal is gained 54 and sent to the op-amp as pressure data 55. The other signal is differentiated 56, gained 58, and sent to the controller 52 as pressure rate data 59. When conditions are proper to spark generation, the controller 52 directs current to transistor 60 or a similar switch, which enables current to flow from DC source 62 to coil 64, closing magnetic relay switches 66 and allowing current to flow form piezoelectric element 10 to spark gap 18. Current will not flow from the capacitor 16 to spark gap 18 beforehand because the voltage of the stored charge is insufficient to bridge the gap before spark generation and subsequent dielectric breakdown of the fuel-air mixture.

Figure 11:
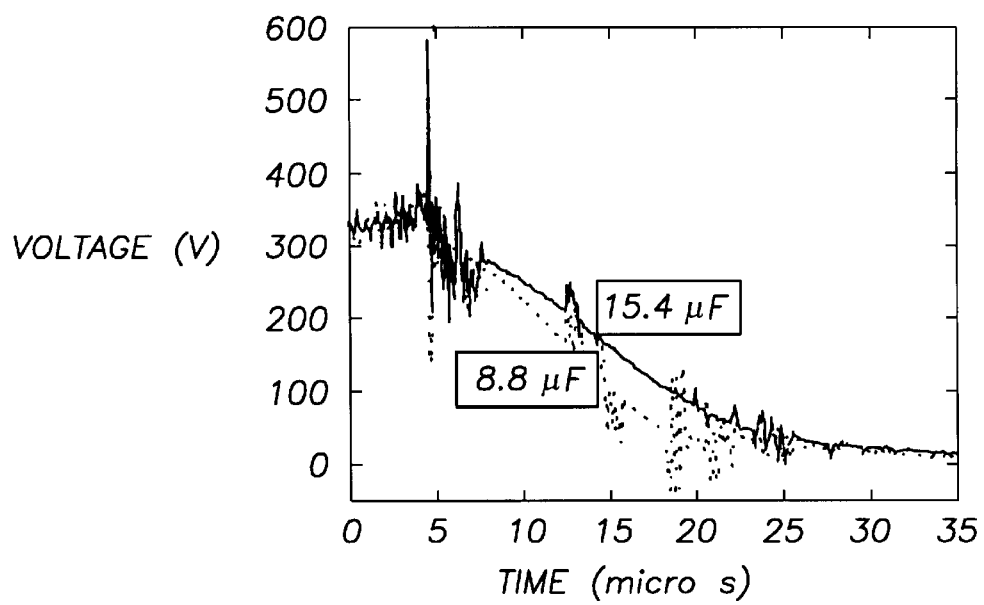
FIG. 11 is a graph depicting the effect of total capacitance on discharge rate.
Figure 12:
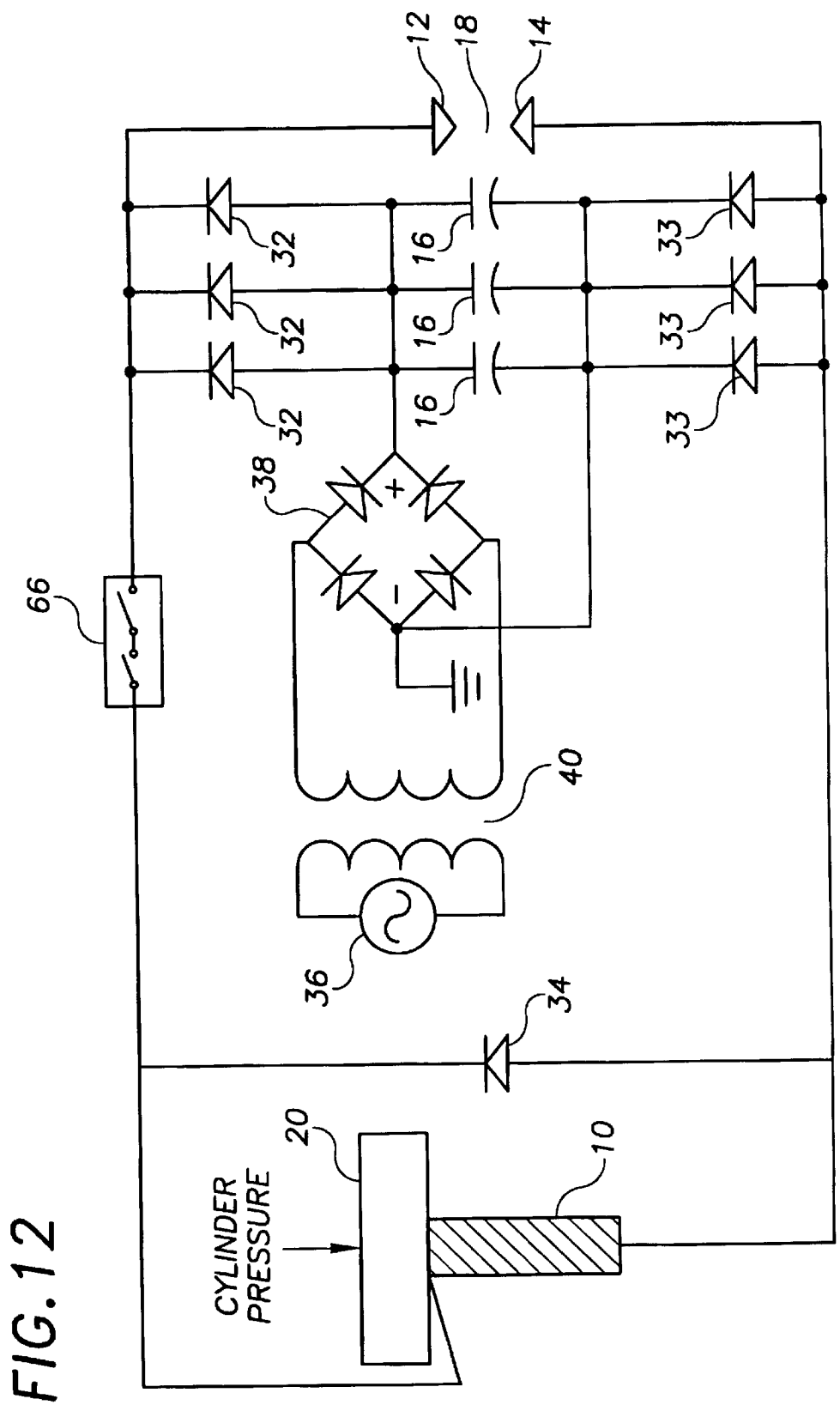
FIG. 12 is a diagram of an exemplary embodiment of the invention.

FIG. 11 illustrates the effect of varying the capacitance during discharge. Smaller capacitance results in faster discharge of less energy. The 15.4 μF capacitor delivers 1.7 J of energy to the spark gap in 20 μs, while the 8.8 μF capacitor delivers 1.1 mJ in 13 μs. However both capacitors provide more energy faster than the ignition systems described by FIG. 4. A plurality of capacitors 16 connected in parallel, as shown in FIG. 12, may be employed to increase the energy supplied to the spark. While the number of capacitors in the circuit is typically not adjusted during operation, the total capacitance may be adjusted for a particular engine or to optimize engine performance by changing the number of capacitors or using differently valued capacitors.

In addition, the change in energy with capacitor size enables the amount of power delivered to the system to be tailored to particular operating conditions. Use of multiple capacitors also enables variation of the power delivered to the spark. This in turn enables EGR and $NO_x$ levels to be optimized for various power levels. The lean limit of the engine can be increased, paving the way for higher EGR concentrations, and thus lower combustion temperatures and lower $NO_x$ concentrations. The burn rate may also be varied to optimize engine efficiency and minimize $NO_x$ emissions.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. An ignition circuit, comprising:
   a piezoelectric element, in communication with a fuel-air mixture, wherein an increase in pressure of the fuel-air mixture causes the piezoelectric element to develop a voltage across its poles;

a capacitor; and a spark gap, wherein:

the piezoelectric element, spark gap, and capacitor are connected in parallel, the piezoelectric element generates a voltage sufficient to produce a spark to cause dielectric breakdown in a fuel-air mixture in response to the increase in pressure, and the voltage of a charge stored on the capacitor is sufficient to traverse the spark gap after dielectric breakdown.

2. The circuit of claim 1, wherein the capacitor is charged by a DC power source.

3. The circuit of claim 2, wherein the source of DC power comprises an AC power source and a bridge rectifier.

4. The circuit of claim 3, wherein the AC power source provides 12 V, and wherein the source of DC power further comprises a 1:40 transformer.

5. The circuit of claim 1, further comprising a plurality of capacitors in parallel with one another.

6. The circuit of claim 1, wherein the charge stored on the capacitor is sufficient to sustain a spark generated by the voltage from the piezoelectric element.

7. The circuit of claim 1, wherein the piezoelectric element comprises a plurality of subelements that combine to generate a voltage equal to the sum of the voltages developed by each subelement.

8. The circuit of claim 1, further comprising a timing circuit in electrical communication with the piezoelectric element, wherein spark timing is determined using voltage information from the piezoelectric element.

9. A method of igniting a spark, comprising exerting pressure on a piezoelectric element to generate a voltage across poles of the piezoelectric element;

placing the piezoelectric element in electrical communication with a spark gap, wherein the voltage across the piezoelectric element is sufficient to cause a spark across a spark gap; and directing current from a capacitor to the spark gap, wherein the current has sufficient energy to traverse the spark gap.

10. The method of claim 9, wherein the energy of the spark resulting from the voltage supplied by the piezoelectric element is sufficient to ignite a fuel-air mixture, and wherein the step of exerting pressure comprises compressing the fuel-air mixture.

11. The method of claim 10, wherein the spark voltage supplied by the piezoelectric element has a voltage at least a factor of 10 greater than the spark voltage supplied by the capacitor.

12. The method of claim 11, wherein the spark voltage supplied by the piezoelectric element has a voltage at least a factor of 50 greater than the spark voltage supplied by the capacitor.

13. The method of claim 12, wherein the spark voltage supplied by the piezoelectric element has a voltage at least a factor of 100 greater than the spark voltage supplied by the capacitor.

14. The method of claim 13, wherein the spark voltage supplied by the piezoelectric element has a voltage at least a factor of 1000 greater than the spark voltage supplied by the capacitor.

15. The method of claim 14, wherein the spark voltage supplied by the piezoelectric element has a voltage at least a factor of 4000 greater than the spark voltage supplied by the capacitor.

16. A method of increasing energy delivery to a fuel-gas mixture, comprising:

placing a piezoelectric element in mechanical communication with a fuel-air mixture and in electrical communication with a spark gap;

increasing the pressure of the fuel-air mixture, whereby a voltage is generated across the poles of the piezoelectric element;

causing dielectric breakdown in the fuel-gas mixture using the voltage generated across the piezoelectric element, thereby reducing impedance of the mixture; and supplying current having a voltage sufficient to bridge a spark gap through the reduced impedance mixture.

* * * * *